(12) United States Patent
Capron et al.

(10) Patent No.: US 8,184,043 B2
(45) Date of Patent: May 22, 2012

(54) SUPER-RESOLUTION IMAGING RADAR

(75) Inventors: Barbara A. Capron, Sammamish, WA (US); Claudio Gilbert Parazzoli, Seattle, WA (US); Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 12/723,098

(22) Filed: Mar. 12, 2010

(65) Prior Publication Data

US 2011/0221630 A1    Sep. 15, 2011

(51) Int. Cl.
*G01S 13/00*    (2006.01)

(52) U.S. Cl. ........................... 342/179; 342/175

(58) Field of Classification Search .............. 372/175, 372/179
See application file for complete search history.

(56) References Cited

U.S. PATENT DOCUMENTS

| | | | | |
|---|---|---|---|---|
| 3,720,950 A | * | 3/1973 | Vehrs, Jr. | 342/162 |
| 3,851,299 A | * | 11/1974 | Wood | 367/90 |
| 4,608,569 A | * | 8/1986 | Dickey et al. | 342/384 |
| 4,716,414 A | * | 12/1987 | Luttrell et al. | 342/179 |
| 4,768,156 A | * | 8/1988 | Whitehouse et al. | 382/279 |
| 4,963,877 A | * | 10/1990 | Wood et al. | 342/25 A |
| 5,227,801 A | * | 7/1993 | Pierce | 342/192 |
| 5,243,351 A | * | 9/1993 | Rafanelli et al. | 342/351 |
| 6,088,295 A | * | 7/2000 | Altes | 367/103 |
| 6,163,293 A | * | 12/2000 | Sezai | 342/196 |
| 6,344,893 B1 | * | 2/2002 | Mendlovic et al. | 356/3.14 |
| 6,777,684 B1 | * | 8/2004 | Volkov et al. | 250/341.1 |
| 7,003,177 B1 | * | 2/2006 | Mendlovic et al. | 382/299 |
| 7,339,521 B2 | * | 3/2008 | Scheidemann et al. | 342/379 |
| 7,385,552 B2 | * | 6/2008 | Archer et al. | 342/179 |
| 7,450,470 B2 | * | 11/2008 | Wilson | 367/68 |
| 7,609,198 B2 | * | 10/2009 | Chang | 342/59 |

(Continued)

FOREIGN PATENT DOCUMENTS

EP    1 099 959 A2    5/2001

OTHER PUBLICATIONS

PCT International Search Report for PCT/US2011/024654, Applicant: The Boeing Company, Form PCT/ISA/210 and 220, dated May 17, 2011 (4 pages).

(Continued)

*Primary Examiner* — Thomas Tarcza
*Assistant Examiner* — Peter Bythrow
(74) *Attorney, Agent, or Firm* — Vista IP Law Group LLP; Cynthia A. Dixon

(57) ABSTRACT

A system, apparatus, and method are disclosed for a super-resolution imaging radar (SRIR). The SRIR employs a pulse signal generator that propagates bursts of radio frequency (RF) energy. Each burst contains a number of pulses. One pulse of each burst is an ancilla pulse, and the remaining pulses are propagated towards an object. An array bucket detector (ABD) collects pulses that are reflected from the object. Also, the ancilla pulses are propagated through a virtual lens. A virtual scanning detector detects the virtual ancilla electric field. A processor calculates a virtual ancilla electric field, which would be present at the scanning detector. Further, a coincidence circuit calculates a cross-time correlation function of the electric fields of the reflected pulses that are collected by the ABD and the virtual ancilla electric field. The coincidence circuit uses cross-time correlation function results to generate pixels of an image of the object.

21 Claims, 2 Drawing Sheets

U.S. PATENT DOCUMENTS 7,978,120 B2 * 7/2011 Longstaff .................. 342/22
8,022,860 B1 * 9/2011 Mukai et al. .............. 342/60
8,102,299 B2 * 1/2012 Young et al. ............ 342/25 A

OTHER PUBLICATIONS

PCT Written Opinion of the International Search Authority for PCT/US2011/024654, Applicant: The Boeing Company, Form PCT/ISA/237, dated May 17, 2011 (6 pages).

Basano, Lorenzo and Ottonello, Pasquale, "A conceptual experiment on single-beam coincidence detection with pseudothermal light," *Optics Express*, Sep. 17, 2007, vol. 15, No. 19.

Chan, Kam Wai Clifford, et al., "High-Order Thermal Ghost Imaging," The Institute of Optics, University of Rochester, 2009, Rochester, New York.

Chen, Xi-Hao, et al., "Lenseless ghost imaging with true thermal light," *Optics Letters*, Mar. 1, 2009, pp. 695-697, vol. 34, No. 5.

Shih, Yanhua, "Ghost imaging," *Quantum Communications and Quantum Imaging at the SPIE Optics + Photonics Symposium*, Aug. 2009, San Diego, California. DOI: 10.1117/2.1200907.1717.

Bromberg, Yaron, et al., "Ghost imaging with a single detector," *Physical Review A*, May 2009, vol. 79, No. 5. DOI: 10.1103/PhysRevA.79.053840.

Freeman, Tony, "What *is* Imaging Radar?" *Jet Propulsion Laboratory*, Jan. 26, 1996, retrieved from http://southport.jpl.nasa.gov/desc/imagingradarv3.html Feb. 17, 2010.

"Synthetic aperture radar," Wikipedia, the free encyclopedia, retrieved from http://en.wikipedia.org/wiki/Synthetic_aperture_radar Feb. 17, 2010.

"Inverse synthetic aperture radar," Wikipedia, the free encyclopedia, retrieved from http://en.wikipedia.org/wiki/Inverse_synthetic_aperture_radar Feb. 17, 2010.

* cited by examiner

SUPER-RESOLUTION IMAGING RADAR

BACKGROUND

The present disclosure relates to super-resolution imaging radar (SRIR). In particular, it relates to super-resolution imaging radar that uses high-order imaging in order to achieve enhanced resolution.

SUMMARY

The present disclosure relates to a system, apparatus, and method for super-resolution imaging radar. In one or more embodiments, the super-resolution imaging radar involves a pulse signal generator that propagates N number of bursts of radio frequency (RF) energy. Each burst contains M+1 number of single pulses. One of the single pulses of each burst is an ancilla pulse, and the remaining M number of pulses of each burst are propagated towards an object of interest. Also, an array bucket detector (ABD) collects pulses that are reflected from the object.

In one or more embodiments, the ancilla pulses are propagated through a virtual lens. In addition, a virtual scanning detector is used to detect the virtual ancilla electric field propagated through the virtual lens. Additionally, a processor uses the ancilla pulses, virtual lens properties, and virtual scanning detector properties to calculate a virtual ancilla electric field, which would be present at the scanning detector plane. Further, a coincidence circuit calculates a cross-time correlation function of the electric fields of the reflected pulses that are collected by the ABD and the virtual ancilla electric field calculated by the processor. The coincidence circuit uses cross-time correlation function results to generate pixels of an image of the object.

In some embodiments, the M number of pulses sequentially illuminate the object. In at least one embodiment, the N number of bursts is inversely proportional to the granularity of the image of the object. In one or more embodiments, the ABD comprises a plurality of RF antenna elements. In at least one embodiment, the condition $$K_{A\perp}^i = -\frac{1}{M}K_{I\perp}^0$$

must be satisfied. $K_I\perp$ represents the transverse component of the wave vector of the imaging fields emitted in each burst, and $K_A\perp$ represents the transverse component of the wave vector of the virtual ancilla field.

In one or more embodiments, the amplitudes of the reflected pulses that are collected by the ABD are stored in digital form. The cross-time correlation function is computed using data that is stored in digital form. In some embodiments, the cross-time correlation function is related to an image-pixel intensity at a location of the virtual scanning detector. In at least one embodiment, the cross-time correlation function is given by $$G^{2(M+1)}(\vec{x}_{2j}) == \sum_{i=1}^{N_e} \langle E_{0j}^*(T_{0j}, \vec{x}_{2j})E_{1j}^*(T_{1j}, i) \ldots E_{Mj}^*(T_{Mj}, i)E_{Mj}(T_{Mj}, i) \ldots$$

$$E_{1j}(T_{1j}, i)E_{0j}(T_{0j}, \vec{x}_{2j})\rangle.$$

$\vec{x}_{2j}$=location of the virtual scanning detector; j=burst index that corresponds to location $\vec{x}_{2j}$=1, 2, ..., N; E=electric field; E*=complex conjugate of the electric field; and T=time of arrival of each burst.

In some embodiments, a method for obtaining super-resolution images involves providing a super-resolution imaging radar (SRIR). In one or more embodiments, the SRIR comprises a pulse signal generator, an array bucket detector (ABD), a virtual lens, a virtual scanning detector, a processor, and a coincidence circuit. The method also involves propagating with the pulse signal generator N number of bursts of radio frequency (RF) energy, where each burst contains M+1 number of single pulses. One of the single pulses of each burst is an ancilla pulse, and the remaining M number of pulses of each burst are propagated towards an object of interest.

The method further involves collecting with the ABD pulses that are reflected from the object. The method also involves propagating the ancilla pulses through the virtual lens and detecting with the virtual scanning detector the virtual ancilla electric field. In addition, the method involves calculating with the processor a virtual ancilla electric field, which would be detected by the virtual scanning detector. Also, the method involves calculating with the coincidence circuit a cross-time correlation function of the electric fields of the reflected pulses that are collected by the ABD and the virtual ancilla electric field calculated by the processor. Lastly, the method involves, generating with the coincidence circuit pixels of an image of the object by using cross-time correlation function results.

In alternative embodiments, a super-resolution imaging radar (SRIR) involves a pulse signal generator that propagates N number of bursts of radio frequency (RF) energy. Each burst contains M+1 number of single pulses. In addition, one of the single pulses of each burst is an ancilla pulse, and the remaining M pulses of each burst are propagated towards an object of interest. The super-resolution imaging radar further involves an array bucket detector (ABD) that collects pulses that are reflected from the object, and a lens. The ancilla pulses are propagated through the lens.

Also, the super-resolution imaging radar involves a scanning detector that detects the ancilla electric field. In addition, the super-resolution imaging radar involves a coincidence circuit that calculates a cross-time correlation function of the electric fields of the reflected pulses that are collected by the ABD and the ancilla electric field detected by the scanning detector. The coincidence circuit uses cross-time correlation function results to generate pixels of an image of the object.

In other embodiments, a method for obtaining super-resolution images involves providing a super-resolution imaging radar (SRIR). The SRIR comprises a pulse signal generator, an array bucket detector (ABD), a lens, a scanning detector, and a coincidence circuit. Also, the method involves propagating with the pulse signal generator N number of bursts of radio frequency (RF) energy. Each burst contains M+1 number of single pulses. And, one of the single pulses of each burst is an ancilla pulse, and the remaining M pulses of each burst are propagated towards an object of interest.

Further, the method involves collecting with the ABD pulses that are reflected from the object, and propagating the ancilla pulses through the lens. In addition, the method involves detecting with the scanning detector the ancilla electric field propagated through the lens to the scanning detector plane. Further, the method involves calculating with the coincidence circuit a cross-time correlation function of the electric fields of the reflected pulses that are collected by the ABD and the ancilla electric field detected by the scanning detector. Also, the method involves generating with the coincidence circuit pixels of an image of the object by using cross-time correlation function results.

DRAWINGS

These and other features, aspects, and advantages of the present disclosure will become better understood with regard to the following description, appended claims, and accompanying drawings where:

DESCRIPTION

Figure 1:
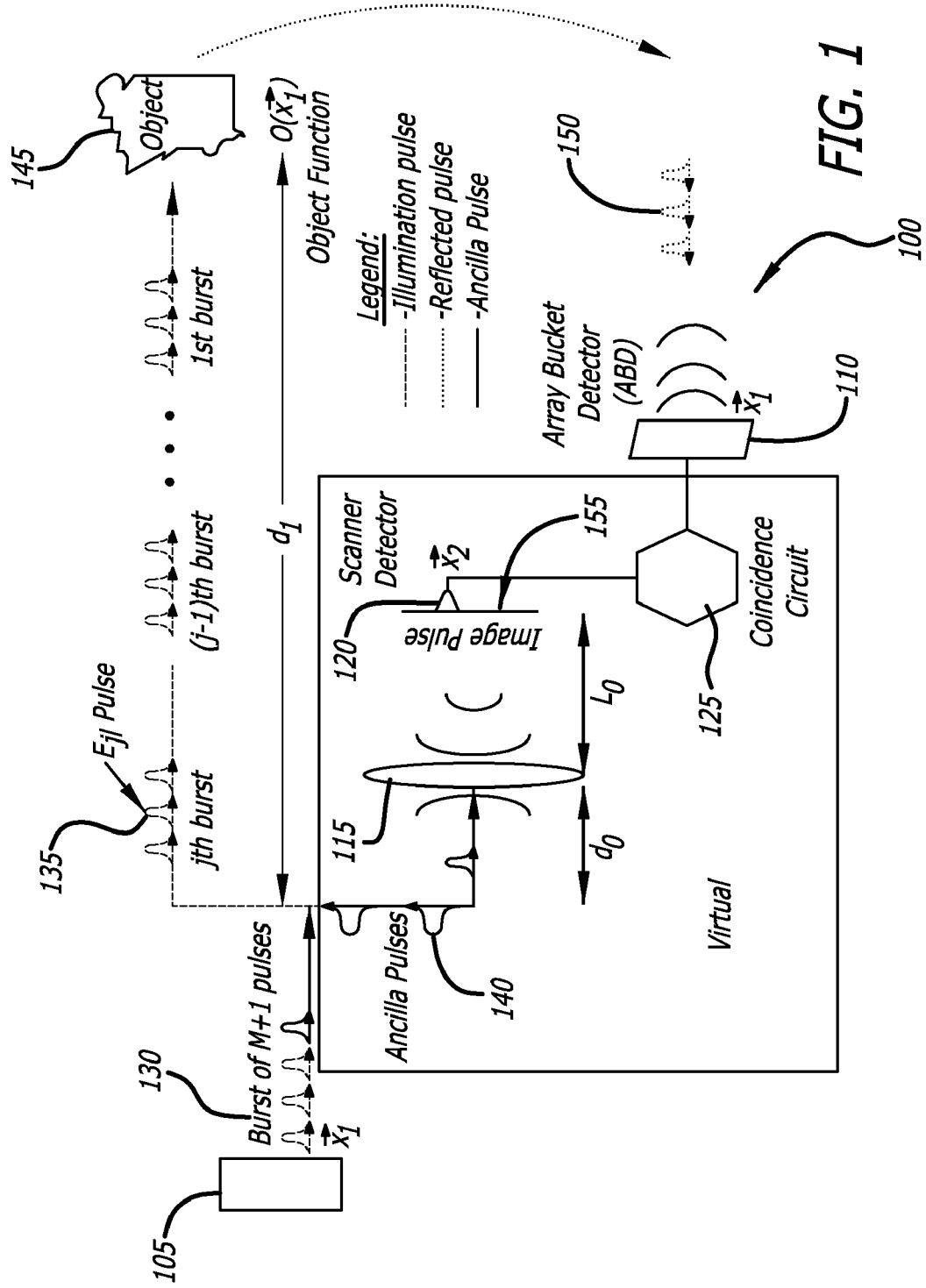
FIG. 1 illustrates a schematic diagram of a super-resolution imaging radar (SRIR), in accordance with at least one embodiment of the present disclosure.

The methods and apparatus disclosed herein provide an operative system for super-resolution imaging radar (SRIR). Specifically, this system relates to super-resolution imaging radar that uses high order imaging in order to achieve enhanced resolution.

The disclosed system modifies a technique known as "ghost imaging" in the optical regime, and adapts it for use with high-resolution imaging radar. This modified technique employs the fourth-order correlation of the electric fields in the microwave or radio frequency (RF) regime to form an image that has a 100× resolution improvement over current state-of-the-art imaging radar. A direct comparison of the disclosed system with the current state-of-the-art in imaging radar shows that the point spread function (PSF) can be decreased from 5-10 m to ~0.045 m.

Imaging radar works very much like a flash camera in that it provides its own light to illuminate an area on the ground and it takes a snapshot picture. But unlike a camera, imaging radar uses radio wavelengths. A flash camera sends out a pulse of light (i.e., the flash) and records on film the light that is reflected back at it through the camera lens. Instead of using a camera lens and film, imaging radar employs a radar antenna and digital computer tapes and/or memory to record the images. Imaging radar measures the strength and round-trip time of the microwave signals that are emitted by the radar antenna and reflected off a distant surface or object. As such, a radar image only shows the light that was reflected back towards the radar antenna.

Currently, there are two main types of imaging radar that are used to generate high-resolution radar images. These two main types are synthetic aperture radar (SAR) and inverse synthetic aperture radar (ISAR). The first of these two types, synthetic aperture radar, is a form of radar in which multiple radar images are processed to yield higher-resolution images than would be possible by using conventional means. Synthetic aperture radar uses (1) one or more antennas mounted on a moving platform, such as an airplane or spacecraft, to illuminate a target area; (2) uses many low-directivity small stationary antennas that are scattered over an area near the target area; or (3) uses combinations thereof. In the case where many low-directivity small stationary antennas are employed, the many echo waveforms received at the different antenna positions are post-processed to resolve the target area.

As such, a disadvantage of synthetic aperture radar is that since synthetic aperture radar can only be implemented by using one or more moving antennas over relatively immobile targets, using multiple stationary antennas over a relatively large area, or using combinations thereof, it requires a high cost, complex system. Additional disadvantages of synthetic aperture radar include the fact that it requires a lot of data storage and the fact that it requires much post-processing in order to generate the resulting image.

The second of the two main types of imaging radar that are used to generate high-resolution radar images is inverse synthetic aperture radar. Inverse synthetic aperture radar is used to generate a two-dimensional (2D) high-resolution image of a target. Inverse synthetic aperture radar images are produced by rotating the target and processing the resultant Doppler histories of the scattering centers.

During operation of an inverse synthetic aperture radar, if the target rotates in the azimuth direction at a constant rate through a small angle, scatters will approach or recede from the radar at a rate depending on the cross range position, which is the distance normal to the radar line of sight with the origin being located at the center of the target axis of rotation. The rotation will result in the generation of cross range dependent Doppler frequencies, which can be sorted by a Fourier transform. This operation is equivalent to the generation of a large synthetic aperture phased array antenna, which is formed by the coherent summation of the receiver outputs for the varying target and/or antenna geometries. As such, if the target is rotated through small angles, the resulting inverse synthetic aperture radar image is the two-dimensional Fourier transform of the received signal as a function of frequency and the target aspect angle.

Conversely, if the target is rotated through large angles, the Doppler frequency history of a scatter is non-linear and follows a sine-wave trajectory. The Doppler frequency history cannot be processed directly by a Fourier transform because the smeared Doppler frequency history will result in a loss of cross range resolution. The maximum angle of rotation that is processed by an unmodified Fourier transform is determined by the constraint that the aperture phase error across the synthesized aperture should vary by less than a specified arbitrary amount, which is usually 45 degrees.

Inverse synthetic aperture radar has a few disadvantages. One disadvantage is that inverse synthetic aperture radar requires motion, which is usually a rotation, between the image and the sensor. Other disadvantages include the fact that inverse synthetic aperture radar requires a lot of data storage and significant post-processing in order to obtain the resulting image of the target.

It should be noted that both of the aforementioned types of imaging radar, synthetic aperture radar and inverse synthetic aperture radar, are limited to using second order correlations of the electric fields in order to produce the resulting image. Currently, there are no known techniques that use higher order correlations for radar imaging. The system of the present disclosure employs higher order correlations between electromagnetic fields at radar frequencies to form images. By employing higher order imaging, the resolution is enhanced due to the mathematical superposition of many exponential products.

The disclosed technique is similar to "coincidence imaging" or ghost imaging in the optical regime. However, a number of modifications are required in order to be able to employ the technique for a radar configuration. In ghost imaging, an object is imaged through the light that illuminates the object and the light that is collected by a single-pixel detector that has no spatial resolution (i.e., a bucket detector).

This is accomplished through the use of two spatially correlated beams. One of the beams illuminates the object, and the photons transmitted by the object are collected by the bucket detector. The other beam impinges on a multipixel detector (e.g., a charge-coupled device (CCD) camera) without ever passing through the object. Nevertheless, by correlating the intensities measured by the bucket detector with the intensities of each pixel in the multipixel detector, an image of the object is reconstructed.

The system of the present disclosure uses a technique that is similar to the technique used in ghost imaging. The main difference between these two techniques is that the system of the present disclosure images an object through the use of radio frequency (RF) energy and, conversely, ghost imaging images an object through the use of beams of light. A detailed discussion of the technique employed by the system of the present disclosure follows.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 shows a schematic diagram of a super-resolution imaging radar (SRIR) 100, in accordance with at least one embodiment of the present disclosure. In this figure, the super-resolution imaging radar comprises a pulse signal generator 105, an array bucket detector (ABD) 110, a virtual lens 115, a virtual scanning detector 120, a processor (not shown), and a coincidence circuit 125.

During operation of the super-resolution imaging radar (SRIR), the pulse signal generator 105 propagates N number of bursts 130 of radio frequency (RF) energy. Each burst 130 of RF energy contains M+1 single pulses 135. One of the single pulses of each burst 130 is an ancilla pulse 140, and the remaining M pulses of each burst 130 are propagated towards an object 145 of interest. As seen in this figure, M pulses sequentially illuminate the object 145. The N number of bursts 130 is inversely proportional to the granularity of the resultant image of the object 145.

An array bucket detector 110 collects the pulses 150 that are reflected from the object 145. In one or more embodiments, the array bucket detector 110 comprises a plurality of RF antenna elements. Various types of RF antenna elements may be employed for the array bucket detector 110 of the present disclosure. In some embodiments, the amplitudes of the reflected pulses 150 that are collected by the array bucket detector 110 are stored in digital form.

Also shown in this figure, the ancilla pulses 140 are propagated through a virtual lens 115. The transverse components of the wave vectors of the imaging fields $K_I \perp$ emitted in each burst 130 must satisfy the condition $$K_{A\perp}^i = -\frac{1}{M} K_{I\perp}^0$$

relative to the transverse component of the wave vector of the virtual ancilla electric field $K_A \perp$.

After a virtual ancilla electric field is propagated through the virtual lens, a virtual scanning detector 120 detects the virtual ancilla electric field along a plane 155. A processor uses the ancilla pulses 140, virtual lens 115 properties, and virtual scanning detector 120 properties to calculate a virtual ancilla electric field, which would be present at the virtual scanning detector 120. A coincidence circuit 125 is used to calculate the cross-time correlation function of the electric fields of the reflected pulses 150 that are collected by the array bucket detector 110 and the virtual ancilla electric field calculated by the processor. In one or more embodiments, the coincidence circuit 125 uses the amplitudes of the reflected pulses 150 that are collected by the array bucket detector 110 and are stored in digital form to compute the cross-time correlation function.

In analogy with the coincidence imaging case, the cross-time correlation function, which is related to the image pixel intensity at $\vec{x}_{2j}$, is given by $$G^{2(M+1)}(\vec{x}_{2j}) = \sum_{i=1}^{N_e} \langle E^*_{0j}(T_{0j}, \vec{x}_{2j}) E^*_{1j}(T_{1j}, i) \ldots E^*_{Mj}(T_{Mj}, i) E_{Mj}(T_{Mj}, i) \ldots E_{1j}(T_{1j}, i) E_{0j}(T_{0j}, \vec{x}_{2j}) \rangle.$$

$\vec{x}_{2j}$ is the location of the virtual scanning detector 120. And, $\vec{x}_{1j}$ is the location of the object 145. Also, j=1, 2, ..., N; and j is burst index that corresponds to location $\vec{x}_{2j}$=1, 2, ..., N. In addition, E is the electric field, E* is the complex conjugate of the electric field, and T is the time of arrival of each burst 130. In alternative embodiments, various other types of cross-time correlation functions may be used with the disclosed system. It should be noted that all of the functions that reside in the box labeled "virtual" in this figure may be performed virtually by software.

In alternative embodiments, some or all of the items that reside in the box labeled "virtual" may actually be non-virtual devices. For example, in at least one embodiment, a tangible RF lens may be substituted for the virtual lens 115 depicted in this figure. Additionally, in some embodiments, a tangible scanning detector may be substituted for the virtual scanning detector 120 of this system. In any embodiment where a "virtual" device is present, a processor is used to calculate the appropriate electric field.

After the coincidence circuit 125 computes the cross-time correlation function, the coincidence circuit 125 uses the cross-time correlation function results to generate pixels of an image of the object 145. Each burst 130 is used to generate one pixel of the resulting image. Subsequent bursts 130 fully paint an image of the object 145. As such, the number of bursts 130 will determine the granularity of the final image.

Figure 2:
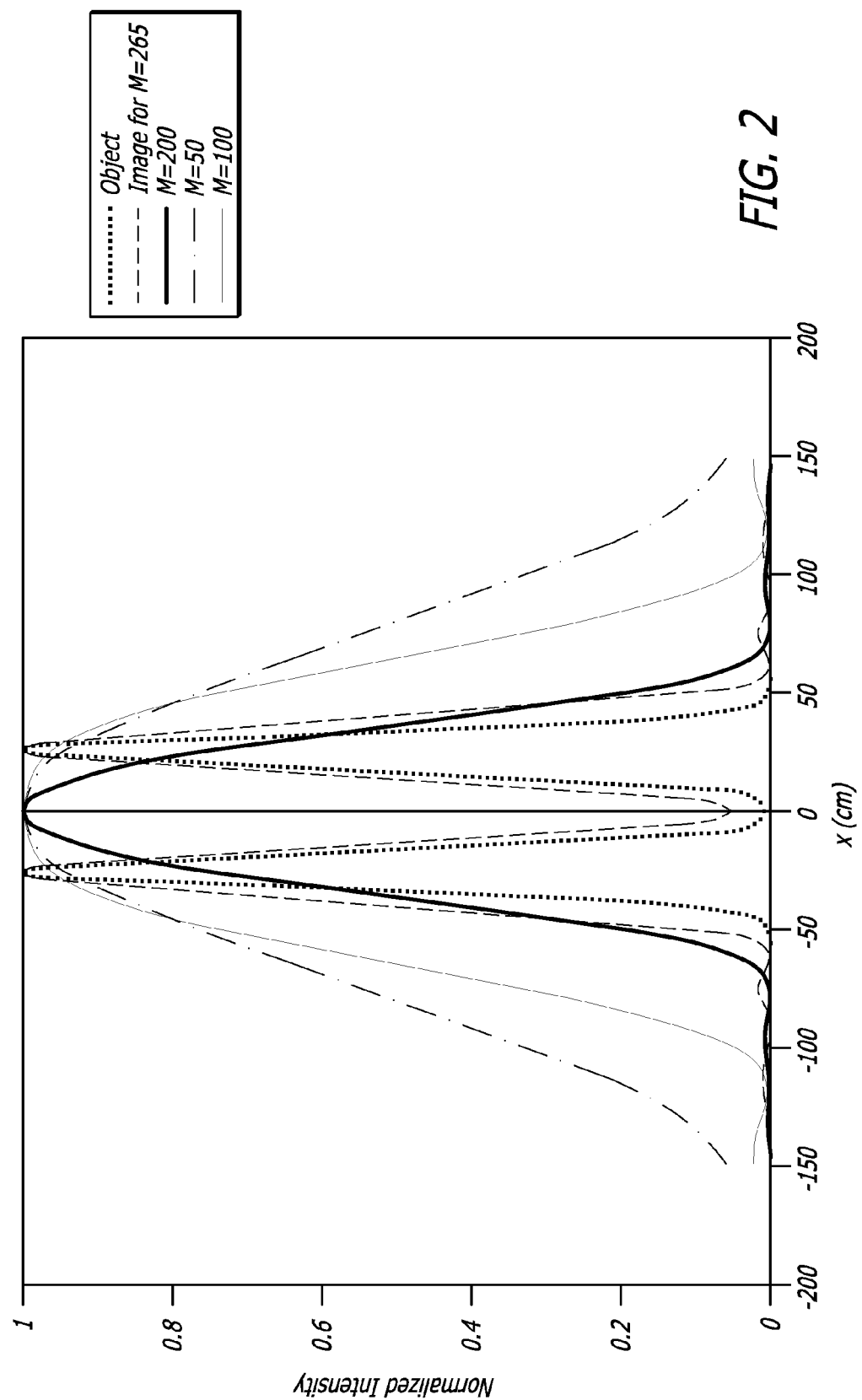
FIG. 2 shows test data from a simulation of a super-resolution imaging radar, in accordance with at least one embodiment of the present disclosure.

FIG. 2 shows test data from a simulation of a super-resolution imaging radar, in accordance with at least one embodiment of the present disclosure. For this simulation, software developed for quantum ghost imaging was adapted to simulate the super-resolution imaging radar of the present disclosure. For this process, several assumptions were made for the sake of simplicity, but the basic elements were preserved. For this particular simulation, radiation at 1.76 cm (17.0 GHz) was used to illuminate an object that was formed by two apodized reflectors of 0.5 m radius. The two-apodized reflectors were separated by 1.0 m, and located at 3.0 Km from the source. The object was illuminated by bursts with M pulses, and the resulting images are shown in this figure. As can be seen in this figure, when the object is illuminated by either 50 or 100 pulses, the outline of the target is completely blurred. When the number of pulses is increased to 200-265, a fully resolved picture of the object is obtained.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, the art disclosed shall be limited only to the extent required by the appended claims and the rules and principles of applicable law.

We claim:

1. A super-resolution imaging radar (SRIR), the SRIR comprising:
   a pulse signal generator,
   wherein the pulse signal generator propagates N number of bursts of radio frequency (RF) energy,
   wherein each burst contains M+1 single pulses,
   wherein one of the single pulses of each burst is an ancilla pulse, and the remaining M pulses of each burst are propagated towards an object of interest;
   an array bucket detector (ABD), wherein the ABD collects pulses that are reflected from the object;
   a virtual lens, wherein the ancilla pulses are propagated through the virtual lens;
   a virtual scanning detector, wherein the virtual scanning detector detects the virtual ancilla electric field;
   a processor, wherein the processor uses the ancilla pulses, virtual lens properties, and virtual scanning detector properties to calculate a virtual ancilla electric field, which would be present at the virtual scanning detector; and
   a coincidence circuit, wherein the coincidence circuit calculates a cross-time correlation function of the electric fields of the reflected pulses that are collected by the ABD and the virtual ancilla electric field,
   and wherein the coincidence circuit uses cross-time correlation function results to generate pixels of an image of the object.

2. The SRIR of claim 1, wherein the M number of pulses sequentially illuminate the object.

3. The SRIR of claim 1, wherein the N number of bursts is inversely proportional to the granularity of the image of the object.

4. The SRIR of claim 1, wherein the ABD comprises a plurality of RF antenna elements.

5. The SRIR of claim 1, wherein the condition $$K_{A\perp}^i = -\frac{1}{M} K_{I\perp}^0$$

must be satisfied where,
   $K_I\perp$ represents the transverse component of the wave vector of the imaging fields emitted in each burst, and
   $K_A\perp$ represents the transverse component of the wave vector of the virtual ancilla field.

6. The SRIR of claim 1, wherein the amplitudes of the reflected pulses that are collected by the ABD are stored in digital form.

7. The SRIR of claim 6, wherein the cross-time correlation function is computed using data that is stored in digital form.

8. The SRIR of claim 1, wherein the cross-time correlation function is related to an image pixel intensity at a location of the virtual scanning detector.

9. The SRIR of claim 1, wherein the cross-time correlation function is given by:

$$G^{2(M+1)}(\vec{x}_{2j}) == \sum_{i=1}^{N_e} \langle E_{0j}^*(T_{0j}, \vec{x}_{2j}) E_{1j}^*(T_{1j}, i) \ldots$$

$$E_{Mj}^*(T_{Mj}, i) E_{Mj}(T_{Mj}, i) \ldots E_{1j}(T_{1j}, i) E_{0j}(T_{0j}, \vec{x}_{2j}) \rangle,$$

where
   $\vec{x}_{2j}$=location of the virtual scanning detector;
   j=burst index that corresponds to location $\vec{x}_{2j}$=1, 2, ..., N;
   E=electric field;
   E*=complex conjugate of the electric field; and
   T=time of arrival of each burst.

10. A method for obtaining super-resolution images, the method comprising:
   providing a super-resolution imaging radar (SRIR),
   wherein the SRIR comprises a pulse signal generator, an array bucket detector (ABD), a virtual lens, a virtual scanning detector, a processor, and a coincidence circuit;
   propagating with the pulse signal generator N number of bursts of radio frequency (RF) energy,
   wherein each burst contains M+1 number of single pulses,
   wherein one of the single pulses of each burst is an ancilla pulse, and the remaining M number of pulses of each burst are propagated towards an object of interest;
   collecting with the ABD pulses that are reflected from the object;
   propagating the ancilla pulses through the virtual lens;
   detecting with the virtual scanning detector the virtual ancilla electric field;
   calculating with the processor a virtual ancilla electric field, which would be present at the virtual scanning detector, by using the ancilla pulses, virtual lens properties, and virtual scanning detector properties;
   calculating with the coincidence circuit a cross-time correlation function of the electric fields of the reflected pulses that are collected by the ABD and the virtual ancilla electric field detected at a virtual scanning detector plane; and
   generating with the coincidence circuit pixels of an image of the object by using cross-time correlation function results.

11. The method for obtaining super-resolution images of claim 10, wherein the M pulses sequentially illuminate the object.

12. The method for obtaining super-resolution images of claim 10, wherein the N number of bursts is inversely proportional to the granularity of the image of the object.

13. The method for obtaining super-resolution images of claim 10, wherein the ABD comprises a plurality of RF antenna elements.

14. The method for obtaining super-resolution images of claim 10, wherein the condition $$K_{A\perp}^i = -\frac{1}{M} K_{I\perp}^0$$

must be satisfied where,
   $K_I\perp$ represents the transverse component of the wave vector of the imaging fields emitted in each burst, and
   $K_A\perp$ represents the transverse component of the wave vector of the virtual ancilla field.

15. The method for obtaining super-resolution images of claim 10, wherein the amplitudes of the reflected pulses that are collected by the ABD are stored in digital form.

16. The method for obtaining super-resolution images of claim 15, wherein the cross-time correlation function is computed using data that is stored in digital form.

17. The method for obtaining super-resolution images of claim 10, wherein the cross-time correlation function is related to an image pixel intensity at a location of the virtual scanning detector.

18. The method for obtaining super-resolution images of claim 10, wherein the cross-time correlation function is given by:

$$G^{2(M+1)}(\vec{x}_{2j}) == \sum_{i=1}^{N_e} \langle E_{0j}^*(T_{0j}, \vec{x}_{2j}) E_{1j}^*(T_{1j}, i) \ldots$$
$$E_{Mj}^*(T_{Mj}, i) E_{Mj}(T_{Mj}, i) \ldots E_{1j}(T_{1j}, i) E_{0j}(T_{0j}, \vec{x}_{2j}) \rangle,$$

where $\vec{x}_{2j}$=location of the virtual scanning detector;

j=burst index that corresponds to location $\vec{x}_{2j}$=1, 2, ..., N;
E=electric field;
E*=complex conjugate of the electric field; and
T=time of arrival of each burst.

19. A super-resolution imaging radar (SRIR), the SRIR comprising:
 a pulse signal generator means,
 wherein the pulse signal generator means propagates N bursts of radio frequency (RF) energy,
 wherein each burst contains M+1 single pulses,
 wherein one of the single pulses of each burst is an ancilla pulse, and the remaining M pulses of each burst are propagated towards an object of interest;
 an array bucket detector (ABD) means, wherein the ABD means collects pulses that are reflected from the object;
 a virtual lens means, wherein the ancilla pulses are propagated through the virtual lens means;
 a virtual scanning detector means, wherein the virtual scanning detector means detects the virtual ancilla electric field;
 a processor means, wherein the processor means uses the ancilla pulses, virtual lens means properties, and virtual scanning detector means properties to calculate a virtual ancilla electric field, which would be present at the virtual scanning detector means; and
 a coincidence circuit means, wherein the coincidence circuit means calculates a cross-time correlation function of the electric fields of the reflected pulses that are collected by the ABD means and the virtual ancilla electric field,
 and wherein the coincidence circuit means uses cross-time correlation function results to generate pixels of an image of the object.

20. A super-resolution imaging radar (SRIR), the SRIR comprising:
 a pulse signal generator,
 wherein the pulse signal generator propagates N number of bursts of radio frequency (RF) energy,
 wherein each burst contains M+1 number of single pulses,
 wherein one of the single pulses of each burst is an ancilla pulse, and the remaining M pulses of each burst are propagated towards an object of interest;
 an array bucket detector (ABD), wherein the ABD collects pulses that are reflected from the object;
 a lens, wherein the ancilla pulses are propagated through the lens;
 a scanning detector, wherein the scanning detector detects the ancilla electric field; and
 a coincidence circuit, wherein the coincidence circuit calculates a cross-time correlation function of the electric fields of the reflected pulses that are collected by the ABD and the ancilla electric field,
 and wherein the coincidence circuit uses cross-time correlation function results to generate pixels of an image of the object.

21. A method for obtaining super-resolution images, the method comprising:
 providing a super-resolution imaging radar (SRIR),
 wherein the SRIR comprises a pulse signal generator, an array bucket detector (ABD), a lens, a scanning detector, a processor, and a coincidence circuit;
 propagating with the pulse signal generator N bursts of radio frequency (RF) energy,
 wherein each burst contains M+1 single pulses,
 wherein one of the single pulses of each burst is an ancilla pulse, and the remaining M number of pulses of each burst are propagated towards an object of interest;
 collecting with the ABD pulses that are reflected from the object;
 propagating the ancilla pulses through the lens;
 detecting with the scanning detector the ancilla electric field;
 calculating with the coincidence circuit a cross-time correlation function of the electric fields of the reflected pulses that are collected by the ABD and the ancilla electric field detected by the scanning detector; and
 generating with the coincidence circuit pixels of an image of the object by using cross-time correlation function results.

* * * * *